US010913221B2

(12) United States Patent
Prause et al.

(10) Patent No.: US 10,913,221 B2
(45) Date of Patent: Feb. 9, 2021

(54) SHAPING A RADIUS FILLER AGAINST A MANDREL

(71) Applicant: The Boeing Company, Chicago, IL (US)

(72) Inventors: Richard Alexander Prause, Charleston, SC (US); Richard Edward Heath, Mt. Pleasant, SC (US)

(73) Assignee: The Boeing Company, Chicago, IL (US)

( * ) Notice: Subject to any disclaimer, the term of this patent is extended or adjusted under 35 U.S.C. 154(b) by 473 days.

(21) Appl. No.: 16/115,442

(22) Filed: Aug. 28, 2018

(65) Prior Publication Data
US 2020/0070442 A1 Mar. 5, 2020

(51) Int. Cl.
*B29C 70/54* (2006.01)
*B29C 70/44* (2006.01)
*B29L 31/30* (2006.01)

(52) U.S. Cl.
CPC ............ *B29C 70/54* (2013.01); *B29C 70/443* (2013.01); *B29L 2031/3076* (2013.01)

(58) Field of Classification Search
None
See application file for complete search history.

(56) References Cited

U.S. PATENT DOCUMENTS

| 9,114,568 | B2 | 8/2015 | Sherwood et al. |
| 9,782,937 | B1 | 10/2017 | Modin et al. |
| 9,827,710 | B2 | 11/2017 | Rossi et al. |
| 2016/0354982 | A1 | 12/2016 | Prause et al. |
| 2018/0001578 | A1 | 1/2018 | Modin et al. |
| 2018/0319050 | A1* | 11/2018 | Prause ................ B29C 43/3642 |

OTHER PUBLICATIONS

Prause et al., "Compacted Stringer Packages," filed May 3, 2017, U.S. Appl. No. 15/586,153, 46 pages.
Heath et al., "Foam Mandrel Assembly," filed Sep. 13, 2017, U.S. Appl. No. 15/649,162, 87 pages.
Peterson et al., "Method for Co-Curing Perpendicular Stiffeners," filed Jun. 18, 2018, U.S. Appl. No. 16/010,905, 43 pages.

* cited by examiner

*Primary Examiner* — Monica A Huson
(74) *Attorney, Agent, or Firm* — Yee & Associates, P.C.

(57) ABSTRACT

A radius filler material positioned at an intersection of a mandrel and a placement surface is heated to form a heated radius filler material. Mechanical pressure is applied to the heated radius filler material to shape the heated radius filler material to a shaped radius filler having a desired shape against a radius of the mandrel. A composite ply is applied over the mandrel and the shaped radius filler.

20 Claims, 14 Drawing Sheets

SHAPING A RADIUS FILLER AGAINST A MANDREL

BACKGROUND INFORMATION

1. Field

The present disclosure relates generally to composites manufacturing and, more specifically, to forming a composite structure having a radius filler. Yet more specifically, the present disclosure relates to forming a radius filler having a desired radius against a mandrel.

2. Background

Aircraft generally include an airframe, which may be regarded as an underlying skeleton to which skins are attached to form a smooth aerodynamic outer surface. Stringers of various shapes may be used for stiffening fuselage sections and wing skins on aircraft. Composite materials are used in aircraft to decrease the weight of the aircraft. Modern aircraft may include both composite stringers and composite skins.

Conventionally, composite stringers are attached to a composite skin using fasteners, co-curing or co-bonding the composite stringers to the composite skin, or a combination of the two. In some conventional processes, composite stringers are assembled on a cure tool common to both the composite stringers and the composite skin. In these conventional processes, the outsides of the composite stringers and inside surface of the composite skin are shaped by the cure tool.

A radius filler, sometimes called a "noodle," is typically used to fill a gap formed by a composite stringer and a composite skin. A radius filler may be formed of any desirable material, such as adhesive film layers, homogeneous composite material, layers of pre-impregnated (pre-preg) composite tape, or pre-preg fabric.

In some processes, a composite radius filler is formed prior to positioning the composite radius filler. Forming a composite radius filler to a desired shape prior to positioning the composite radius filler may have a higher cost than desired. Forming a composite radius filler to a desired shape prior to positioning may use specialized tooling. Therefore, it would be desirable to have a method and apparatus that take into account at least some of the issues discussed above, as well as other possible issues.

SUMMARY

An illustrative embodiment of the present disclosure provides a method. A radius filler material positioned at an intersection of a mandrel and a placement surface is heated to form a heated radius filler material. Mechanical pressure is applied to the heated radius filler material to shape the heated radius filler material to a shaped radius filler having a desired shape against a radius of the mandrel. A composite ply is applied over the mandrel and the shaped radius filler.

Another illustrative embodiment of the present disclosure provides a method. A radius filler material is placed at an intersection of a mandrel and a placement surface. The radius filler material is formed to a shaped radius filler having a desired shape by applying mechanical pressure and heat to the radius filler material while the radius filler material is at the intersection.

A further illustrative embodiment of the present disclosure provides a method. A radius filler material positioned at an intersection of a mandrel and a placement surface is shaped to form a shaped radius filler having a desired shape. A composite ply is applied over the shaped radius filler and the mandrel. The composite ply is placed in contact with a composite skin. The composite ply and composite skin are co-cured while the composite ply is in contact with the shaped radius filler on the mandrel and the composite skin.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
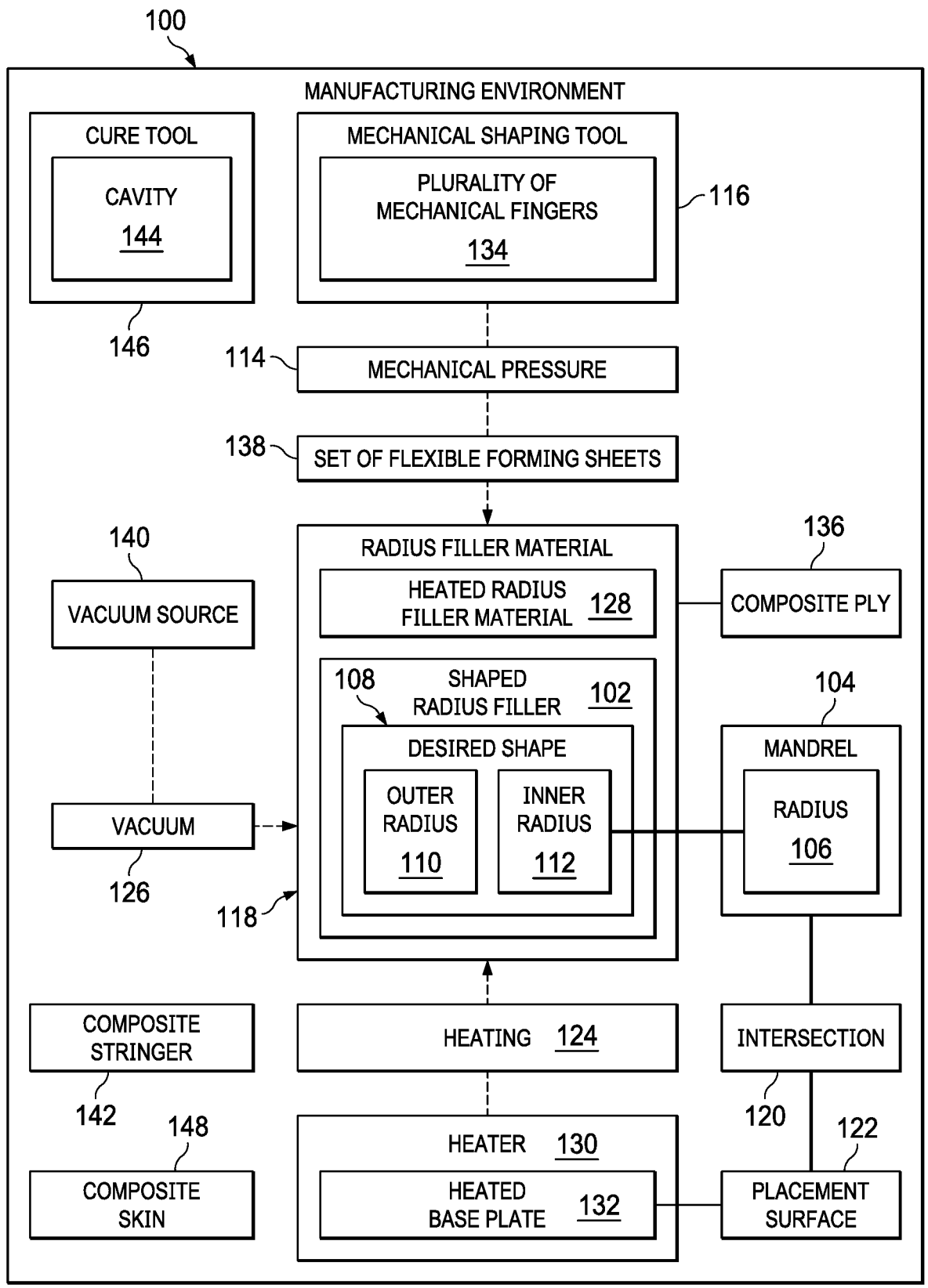
FIG. 1 is an illustration of a block diagram of a manufacturing environment in accordance with an illustrative embodiment.

The illustrative embodiments recognize and take into account one or more different considerations. For example, the illustrative embodiments recognize and take into account that composite materials are used in aircraft to decrease weight of the aircraft. This decreased weight improves performance features such as payload capacity and fuel efficiency. Further, composite materials provide longer service life for various components in an aircraft.

The illustrative embodiments recognize and take into account that composite materials may be tough, light-weight materials created by combining two or more functional components. For example, a composite material may include reinforcing fibers bound in a polymer resin matrix. The fibers may be unidirectional or may take the form of a woven cloth or fabric. The fibers and resins may be arranged and cured to form a composite structure.

For example, the illustrative embodiments recognize and take into account that when a cure tool shapes a stiffened composite skin, the cure tool shapes an outside of a composite stringer and the surface of the composite skin contacting the composite stringer. The surface of the composite skin contacting the composite stringer is referred to as an "inner" surface. When a cure tool shapes the outside of a composite stringer and the inner surface of the composite skin, the cure tool may be referred to as an inner mold line (IML) tool. When an inner mold line tool is used to shape a composite stringer, a partially shaped noodle may be used in the composite stringer. The illustrative examples recognize and take into account that the partially shaped noodle may be passively formed during forming of the inner surface of the composite skin and the outside of a composite stringer by an inner mold line tool. The illustrative examples recognize and take into account that the final geometry of the noodle is passively shaped during the compaction/curing process in IML tooling.

The illustrative examples recognize and take into account that inner mold line tooling has a vacuum bag or other flexible medium against the "outside" of the composite skin. The illustrative examples also recognize and take into account that some composite stringers are desirably cured with outer mold line (OML) tooling. Outer mold line tooling has tooling on the side of the composite skin that is not in contact with the composite stringers. When outer mold line tooling is used, a vacuum bag or other flexible medium is used against the "inner" surface of the composite skin and over the composite stringers.

The illustrative examples recognize and take into account that passive shaping of a radius filler is may not be possible for outer mold line tooling. For example, the illustrative examples recognize and take into account that passive shaping of a radius filler may not be possible if there is limited access to the radius location due to the order of buildup locations. As another example, the illustrative examples recognize and take into account that a vacuum bag may not apply a desired amount of force or a desired direction of force to passively shape a radius filler to a desired shape. The illustrative examples recognize and take into account that a radius filler has a desired shape when the radius filler is placed in contact with a composite ply of at least one of a stiffener or a composite skin.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The illustrative embodiments recognize and take into account that radius fillers with reinforcement, such as a laminated fiber noodle or a homogeneous fiber noodle may be conventionally shaped prior to being in place against a composite ply of the stiffener or the composite skin. The illustrative embodiments recognize and take into account that forming and shaping composite radius fillers prior to placement may have at least one of an undesirable cost or an undesirably complexity. For example, shaping, lifting, and moving the shaped radius filler may take an undesirable amount of time, adding cost. As another example, lifting and moving the shaped radius filler utilizes large movement equipment that adds a large footprint to a manufacturing facility. As a further example, pre-shaping a radius filler prior to placement of the radius filler may utilize rigid tooling. The illustrative embodiments recognize and take into account that changing a shape of a radius filler may cause new tooling to be created for forming the changed shape.

The illustrative embodiments recognize and take into account that radius fillers without structural reinforcement, such as adhesive layers, may not be shaped prior to placement against a composite ply. For example, a radius filler without structural reinforcement may lose shape during lifting and positioning.

The illustrative embodiments recognize and take into account that it would be desirable to present new methods of actively shaping radius fillers. The illustrative embodiments recognize and take into account that it would be desirable to reduce the amount of tooling to shape and transport radius fillers. The illustrative embodiments recognize and take into account that it would be desirable to increase the quality of stiffened composite skin formed using OML tools. The illustrative embodiments recognize and take into account that it would be desirable to reduce at least one of the time or cost of manufacturing composite stiffeners. The illustrative embodiments recognize and take into account that it would be desirable to increase the applications for radius filler material without reinforcement.

Turning now to FIG. 1, an illustration of a block diagram of a manufacturing environment is depicted in accordance with an illustrative embodiment. Manufacturing environment 100 is an example of an environment in which shaped radius filler 102 may be formed. Shaped radius filler 102 is formed against mandrel 104 having radius 106.

Shaped radius filler 102 has desired shape 108. Desired shape 108 includes outer radius 110 and inner radius 112. Outer radius 110 is formed by mechanical pressure 114 applied by mechanical shaping tool 116 to outer radius 110.

Inner radius 112 is formed against radius 106 of mandrel 104 as mechanical pressure 114 is applied to outer radius 110.

Radius filler material 118 is placed at intersection 120 of mandrel 104 and placement surface 122. Radius filler material 118 is selected from any desirable material. In some illustrative examples, radius filler material 118 is selected from layers of adhesive material, layers of pre-impregnated composite material, or a homogeneous composite material. Radius filler material 118 has any desired "unformed" cross-sectional shape. In some illustrative examples, radius filler material 118 has an approximately square cross-sectional shape.

Mandrel 104 is positioned on placement surface 122 to form intersection 120. Each of mandrel 104 and placement surface 122 is prepared using any desirable layers of material. In some illustrative examples, at least one of a breather layer, a barrier film layer, a release film, or a composite layer is wrapped around mandrel 104. In some illustrative examples, at least one of a breather layer, a barrier film layer, a release film, or a composite layer is associated with and positioned over placement surface 122.

When mandrel 104 is positioned on placement surface 122, the outermost layer of films on mandrel 104 contacts the outermost layer of films on placement surface 122. In some illustrative examples, mandrel 104 directly contacts placement surface 122.

When radius filler material 118 is placed at intersection 120 of mandrel 104 and placement surface 122, radius filler material 118 is in contact with an outermost layer of films on mandrel 104 and an outermost layer of films on placement surface 122. In some illustrative examples, when neither mandrel 104 nor placement surface 122 has associated layers of film, radius filler material 118 at intersection 120 is in contact with mandrel 104 and placement surface 122.

After placing radius filler material 118 at intersection 120 of mandrel 104 and placement surface 122, radius filler material 118 is shaped to form shaped radius filler 102 having desired shape 108. Shaping radius filler material 118 comprises heating 124 radius filler material 118 at intersection 120 and applying mechanical pressure 114 to radius filler material 118 during heating 124. In some illustrative examples, shaping radius filler material 118 further comprises drawing vacuum 126 on radius filler material 118. In some illustrative examples, shaping radius filler material 118 comprises heating 124 radius filler material 118 at intersection 120, drawing vacuum 126 on radius filler material, and applying mechanical pressure to radius filler 118 during heating 124 and drawing vacuum 126.

Heating 124 radius filler material 118 positioned at intersection 120 of mandrel 104 and placement surface 122 forms heated radius filler material 128. Heating 124 is performed by any desirable type of heater 130. Heater 130 may be a heat gun, a heat lamp, heated base plate 132, or any other desirable type of heater. When heater 130 is heated base plate 132, placement surface 122 comprises heated base plate 132. In some illustrative examples, heated base plate 132 is a selectable portion of placement surface 122. In some illustrative examples, heated base plate 132 forms all of placement surface 122. When placement surface 122 comprises heated base plate 132, radius filler material 118 is positioned on heated base plate 132.

Mechanical pressure 114 is applied to heated radius filler material 128 to shape heated radius filler material 128 to shaped radius filler 102 having desired shape 108 against radius 106 of mandrel 104. Inner radius 112 is formed against radius 106 of mandrel 104. Inner radius 112 is selected by selecting mandrel 104 having a desired radius, radius 106.

Outer radius 110 is formed by application of mechanical pressure 114 by mechanical shaping tool 116. Outer radius 110 may be adjusted by adjusting an angle of application of mechanical pressure 114. Outer radius 110 may be adjusted by changing type of mechanical shaping tool 116. Mechanical shaping tool 116 takes any desirable form. Mechanical shaping tool 116 may be an inflatable bladder, a roller, a male mold structure, a dowel, or any other desirable type of mechanical shaping tool.

In some illustrative examples, mechanical shaping tool 116 has plurality of mechanical fingers 134. Plurality of mechanical fingers 134 may have any desirable shape and be actuated by any desirable force.

In some illustrative examples, mechanical shaping tool 116 is configured to sweep across a composite ply, such as composite ply 136, to apply the composite ply to a mandrel, such as mandrel 104. In some illustrative examples, mechanical shaping tool 116 is used to shape radius filler material 118 and subsequently apply composite ply 136 over shaped radius filler 102.

When plurality of mechanical fingers 134 is used to shape radius filler material 118, outer radius 110 is adjusted by introducing additional material between the ends of plurality of mechanical fingers 134 and radius filler material 118. In some illustrative examples, manufacturing of different radius shapes for outer radius 110 in radius filler material 118 is accomplished by using set of flexible forming sheets 138 or attaching material to ends of plurality of mechanical fingers 134.

In some illustrative examples, prior to applying mechanical pressure 114, set of flexible forming sheets 138 is applied over radius filler material 118. In these illustrative examples, set of flexible forming sheets 138 is applied to change outer radius 110.

Set of flexible forming sheets 138 is one or more flexible forming sheets. Set of flexible forming sheets 138 has any desirable quantity of sheets, any desirable materials, and any desirable thicknesses. In some illustrative examples, set of flexible forming sheets 138 includes a slip sheet as an outer sheet. In these illustrative examples, slip sheet enables plurality of mechanical fingers 134 to slip across set of flexible forming sheets 138 to a desired location for application of mechanical pressure 114. In some illustrative examples, set of flexible forming sheets 138 comprises at least one type of flexible polymeric material, such as a rubber.

In some illustrative examples, vacuum pressure is applied to heated radius filler material 128 during application of mechanical pressure 114. Vacuum 126 is applied by vacuum source 140. To apply vacuum 126 to radius filler material 118. A vacuum bag (not depicted) or other gas-impermeable material is placed over radius filler material 118 prior to shaping.

Mechanical pressure 114, vacuum 126, and heating 124 are applied in any desirable order. In some illustrative examples, heating 124 is applied prior to applying mechanical pressure 114. Mechanical pressure 114 is maintained for a desired period of time during heating 124 radius filler material 118 and optionally applying vacuum pressure to heated radius filler material 128.

The desired period of time is selected based on the flow properties of radius filler material 118 at the processing temperature. The desired period of time is selected to provide a desired shape throughout the length of shaped radius filler 102. In some illustrative examples, the desired period of time is in the range of 2 to 20 minutes. In some illustrative examples, the desired period of time is approximately 10 minutes.

Mechanical pressure 114, vacuum 126, and heating 124 are removed in any desirable order. In some illustrative examples, vacuum pressure is maintained after removing the mechanical pressure.

Shaped radius filler 102 is cooled prior to further processing or manufacturing. In some illustrative examples, composite ply 136 is applied over mandrel 104 and shaped radius filler 102. In these illustrative examples, shaped radius filler 102 is cooled prior to application of composite ply 136.

In some illustrative examples, vacuum 126 is applied to radius filler material 118 while shaped radius filler 102 cools. In some illustrative examples, vacuum 126 is applied to radius filler material 118 until heated base plate 132 has cooled to a desired temperature.

In some illustrative examples, shaped radius filler 102 and composite ply 136 are components of a composite stiffener, such as composite stringer 142. In some illustrative examples, mandrel 104 may be used to transport composite stringer 142 in an uncured form.

In some illustrative examples, shaped radius filler 102 is transported without composite ply 136. In some illustrative examples, mandrel 104 is used to transport and place shaped radius filler 102.

Mandrel 104 may be used to transport shaped radius filler 102 and place shaped radius filler 102 in associated with either an inner mold line (IML) tool or an outer mold line (OML) tool. In some illustrative examples, mandrel 104 and shaped radius filler 102 are placed within cavity 144 of cure tool 146. Cure tool 146 may be described as a "female mold" or an IML tool.

In some illustrative examples, mandrel 104 is used to place composite ply 136 in contact with composite skin 148 on an outer mold line (OML) tool. In some illustrative examples, mandrel 104 is used to place composite stringer 142, including shaped radius filler 102, in contact with composite skin 148 on an outer mold line (OML) tool. In some illustrative examples, a vacuum bag is placed over composite stringer 142 prior to curing composite stringer 142. In some illustrative examples, mandrel 104 remains in contact with shaped radius filler 102 during curing of a composite structure, such as composite stringer 142.

In some illustrative examples, a vacuum bag is placed over composite ply 136, shaped radius filler 102, and mandrel 104. Afterwards, composite ply 136 is cured while composite ply 136 is in contact with shaped radius filler 102 on mandrel 104. In some illustrative examples, the curing of composite ply 136 comprises co-curing composite ply 136 with composite skin 148 to form a stiffened composite skin.

A series of steps are performed to form shaped radius filler 102. Mandrel 104 is prepared to be used. Preparation of mandrel 104 includes a selection of a desired size and shape of mandrel and application of any desirable films or layers to mandrel 104.

Placement surface 122 is prepared to be used. Preparation of placement surface 122 includes applying any desirable films or layers to placement surface 122.

After placement surface 122 and mandrel 104 are prepared, mandrel 104 is aligned on placement surface 122. In some illustrative examples, aligning mandrel 104 on placement surface 122 includes positioning mandrel 104 under plurality of mechanical fingers 134 of mechanical shaping tool 116.

Radius filler material 118 in an unshaped or partially shaped form is placed relative to radius 106 of mandrel 104. Radius filler material 118 is placed against radius 106 at placement surface 122. Although radius filler material 118 is provided with an unshaped or partially shaped form, radius filler material 118 is provided in the desired cross-sectional volume.

In some illustrative examples, a vacuum bag (not depicted) is placed over mandrel 104 and radius filler material 118. In some illustrative examples, set of flexible forming sheets 138 are placed over mandrel 104 and radius filler material 118 to achieve a desired radius value. In some illustrative examples, a slip sheet is one of set of flexible forming sheets 138.

When placement surface 122 comprises heated base plate 132, heated base plate 132 is activated to heat radius filler material 118. Heated base plate 132 is heated to a desirable temperature. Heated base plate 132 is heated to a temperature for formability of radius filler material 118.

Plurality of mechanical fingers 134 is activated. After activating plurality of mechanical fingers 134, plurality of mechanical fingers engage the radius. Vacuum 126 is applied beneath the vacuum bag on heated radius filler material 128.

Mechanical pressure 114 is maintained with plurality of mechanical fingers 134 engaged in the radius, vacuum 126 engaged, and heated base plate 132 heated at a desirable temperature for a desired period of time. The desirable temperature is selected based on the type of material of radius filler material 118. The desirable temperature is selected to provide a desired flow rate for radius filler material 118. The desirable temperature is selected such that radius filler material 118 is not degraded by heat at the desirable temperature. In some illustrative examples, a desirable temperature may be in the range of ambient temperature to 200 degrees Fahrenheit. In some illustrative examples, a desirable temperature is up to 150 degrees Fahrenheit. In some illustrative examples, a desirable temperature is in the range of 70 degrees Fahrenheit to 100 degrees Fahrenheit. In some illustrative examples, the desirable temperature is in the range of 120 degrees Fahrenheit to 130 degrees Fahrenheit.

Plurality of mechanical fingers 134 is disengaged. Heating 124 is ceased. Set of flexible forming sheets 138 are removed from shaped radius filler 102. In some illustrative examples, vacuum 126 remains engaged until heated base plate 132 reaches a desirably cooled temperature. The desirably cooled temperature is selected based on material properties of radius filler material 118. In some illustrative examples, a desirably cooled temperature is reached when heated base plate 132 is within the range of 70 degrees Fahrenheit to 100 degrees Fahrenheit. In some illustrative examples, a desirably cooled temperature is reached when heated base plate 132 drops below 85 degrees Fahrenheit.

After shaping, the vacuum bag is removed from shaped radius filler 102. In some illustrative examples, outer radius 110 of desired shape 108 is verified. In some illustrative examples, outer radius 110 is verified with a radius gage.

After shaping, mandrel 104 and shaped radius filler 102 are ready for further processing. In some illustrative examples, composite stringer 142 is formed on top of mandrel 104 with shaped radius filler 102. In some illustrative examples, mandrel 104 with shaped radius filler 102 may be placed in contact with a composite skin. In some illustrative examples, mandrel 104 with shaped radius filler 102 may be placed into an already formed composite stringer.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, more than one shaped radius filler may be present in manufacturing environment 100. For example, although only shaped radius filler 102 is depicted, a second radius filler material may be present at an opposite side of intersection 120 of mandrel 104 and placement surface 122. In these illustrative examples, plurality of mechanical fingers 134 may apply mechanical pressure 114 to radius filler materials on opposite sides of intersection 120 substantially simultaneously.

As another example, any desirable type of and quantity of layers of film may be optionally positioned over radius filler material 118 prior to shaping radius filler material 118. For example, a release film may be positioned over radius filler material 118 prior to shaping radius filler material 118. As another example, a film to facilitate sliding of plurality of mechanical fingers 134 may be positioned over radius filler material 118 prior to shaping radius filler material 118.

As another example, any desirable type of and quantity of layers of film may be optionally positioned over composite ply 136. For example, a film to facilitate sliding of plurality of mechanical fingers 134 may be positioned over composite ply 136 prior to applying composite ply 136 over mandrel 104.

Figure 2:
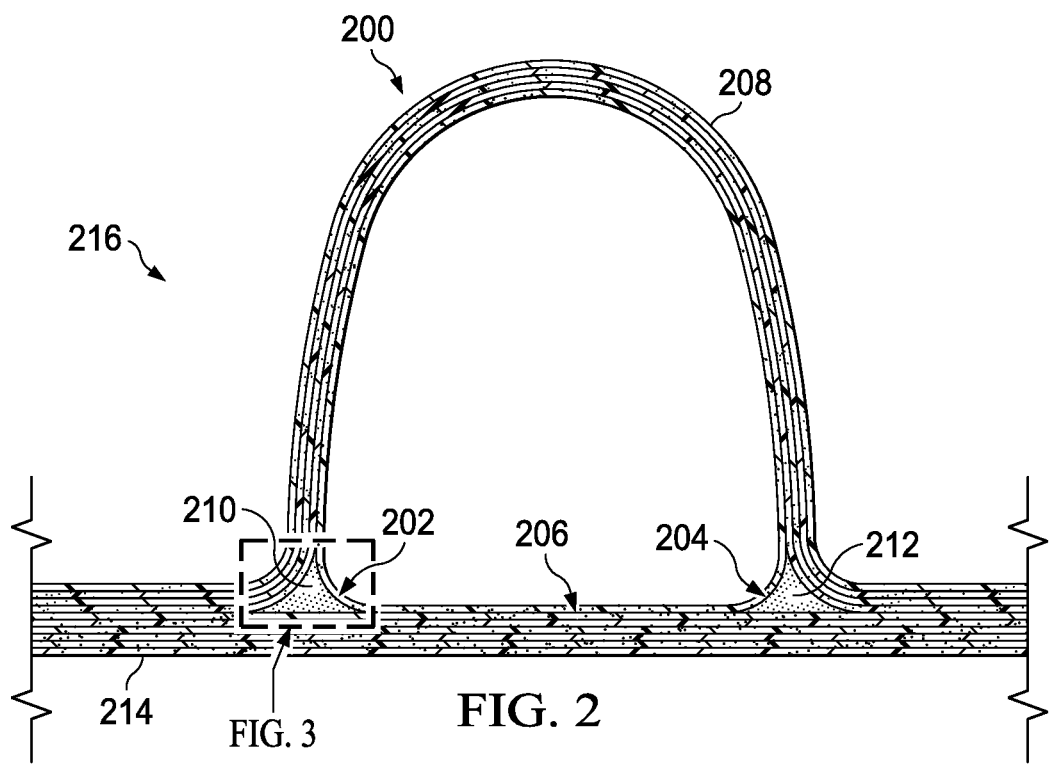
FIG. 2 is an illustration of a cross-sectional view of a composite stringer on a composite skin in accordance with an illustrative embodiment.

Turning now to FIG. 2, an illustration of a cross-sectional view of a composite stringer on a composite skin is depicted in accordance with an illustrative embodiment. Composite stringer 200 is a physical implementation of composite stringer 142 of FIG. 1. Composite stringer 200 comprises shaped radius filler 202, shaped radius filler 204, composite ply 206, and composite ply 208. Shaped radius filler 202 and shaped radius filler 204 are physical implementations of shaped radius filler 102 of FIG. 1. In some illustrative examples, shaped radius filler 202 and shaped radius filler 204 are formed substantially simultaneously against a mandrel, such as mandrel 104. In some illustrative examples, shaped radius filler 202 and shaped radius filler 204 are formed substantially simultaneously by applying mechanical pressure to both radius filler material 210 of shaped radius filler 202 and radius filler material 212 of shaped radius filler 204 using a mechanical shaping tool having a plurality of mechanical fingers (not depicted).

As depicted, composite stringer 200 is positioned on composite skin 214. As depicted, composite stringer 200 and composite skin 214 have been co-cured to form stiffened composite skin 216. As depicted, a mandrel, such as mandrel 104 of FIG. 1 has been removed from composite stringer 200.

Figure 3:
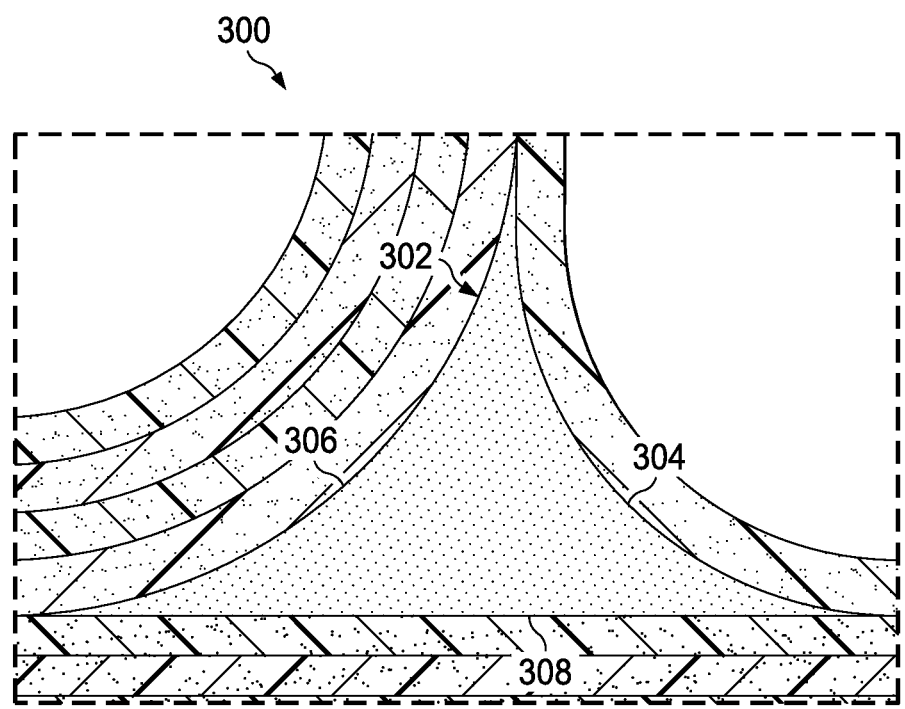
FIG. 3 is an illustration of a cross-sectional view of a shaped radius filler in accordance with an illustrative embodiment.

Turning now to FIG. 3, an illustration of a cross-sectional view of a shaped radius filler is depicted in accordance with an illustrative embodiment. Shaped radius filler 300 is a physical implementation of shaped radius filler 102 of FIG. 1. Shaped radius filler 300 is an implementation of shaped radius filler 202 of FIG. 2.

Shaped radius filler 300 has desired shape 302 including inner radius 304 and outer radius 306. Outer radius 306 is formed using application of mechanical pressure from a mechanical shaping tool, such as mechanical shaping tool 116 of FIG. 1. Inner radius 304 is formed against a radius of a mandrel, such as radius 106 of mandrel 104 of FIG. 1. Base 308 of shaped radius filler 300 is formed against a placement surface, such as placement surface 122 of FIG. 1.

Figure 4:
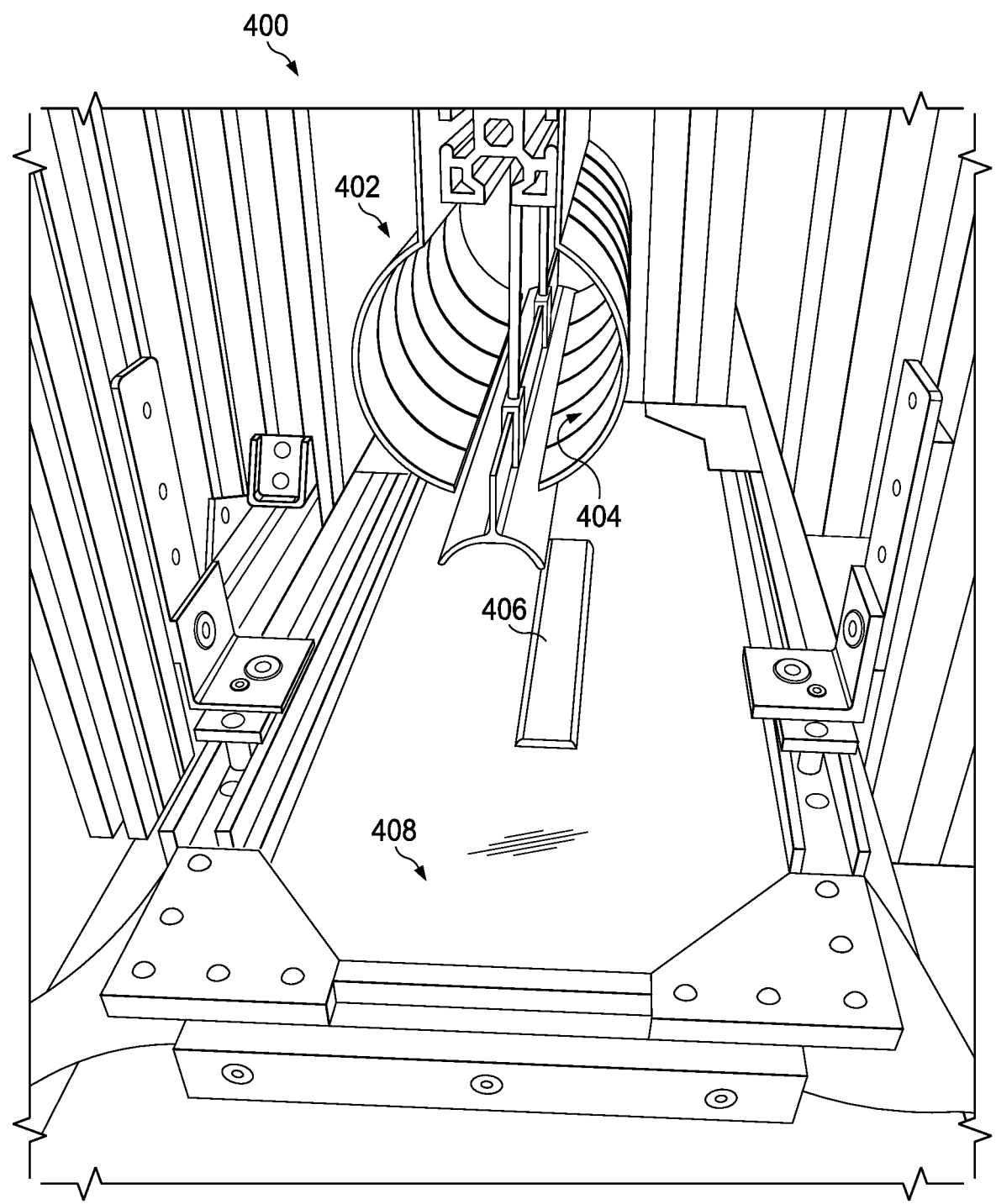
FIG. 4 is an illustration of a perspective view of a manufacturing environment in accordance with an illustrative embodiment.

Turning now to FIG. 4, an illustration of a perspective view of a manufacturing environment is depicted in accordance with an illustrative embodiment. Manufacturing environment 400 is a physical implementation of manufacturing environment 100 of FIG. 1. Composite stringer 200 of FIG. 2 may be formed in manufacturing environment 400 of FIG. 4. Shaped radius filler 300 of FIG. 3 may be formed in manufacturing environment 400 of FIG. 4.

Mechanical shaping tool 402 in manufacturing environment 400 is a physical implementation of mechanical shaping tool 116 of FIG. 1. Mechanical shaping tool 402 includes plurality of mechanical fingers 404 that slide across a composite ply on mandrel 406 when forming a composite ply. In some illustrative examples, mechanical fingers 404 apply pressure to radius filler material (not depicted) at an intersection of placement surface 408 and mandrel 406 to shape the radius filler material.

Mechanical fingers 404 may have any desirable shape and be actuated by any desirable force. As depicted, mandrel 406 is present on placement surface 408 to shape radius filler material, a composite ply, or any other desirable material to receive shaping on placement surface 408. In some illustrative examples, a composite stringer, such as composite stringer 142, is formed on mandrel 406 and transported using mandrel 406 after forming. In some illustrative examples, mandrel 406 is used in both forming and curing a composite stringer, such as composite stringer 142.

Figure 5:
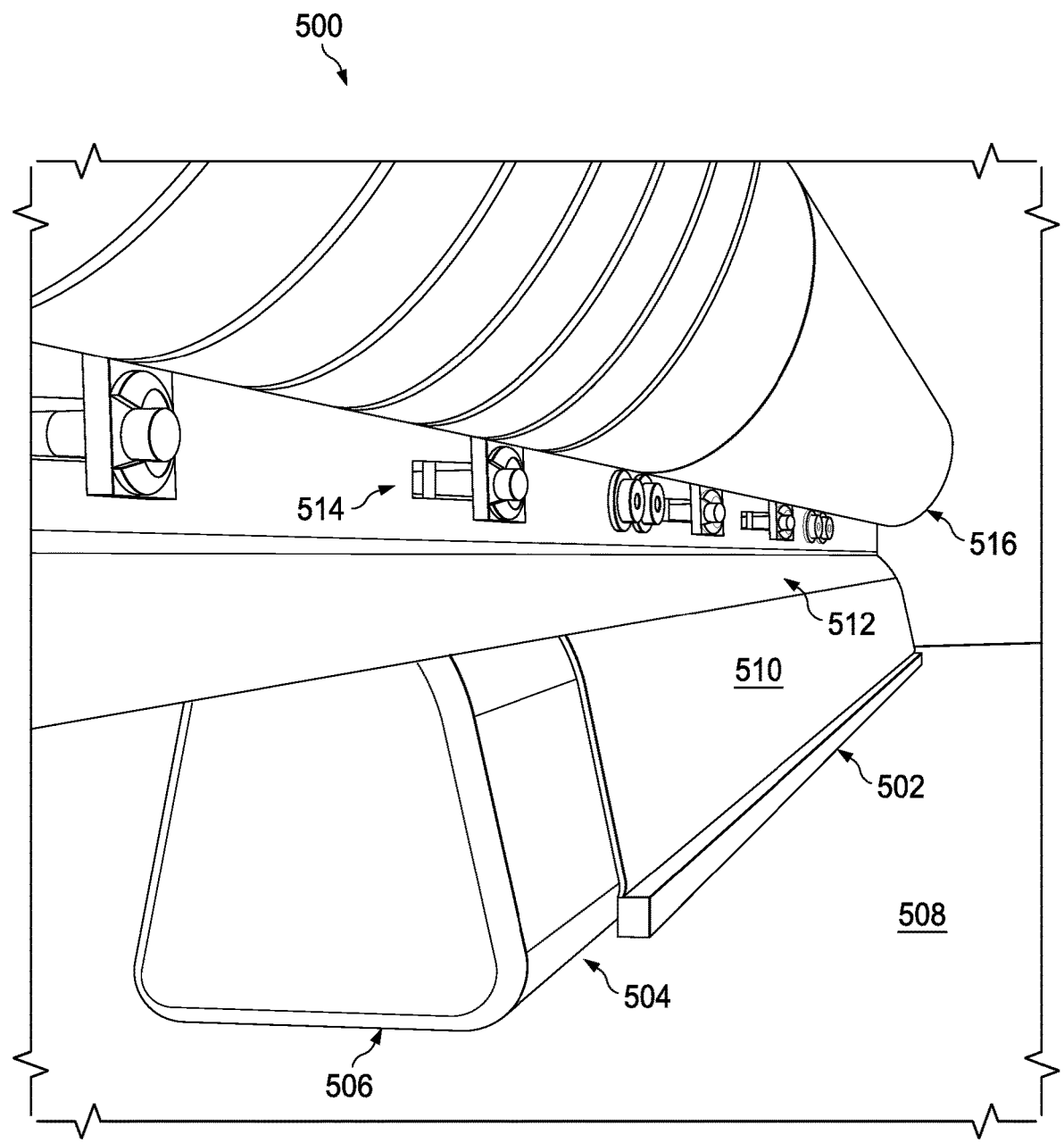
FIG. 5 is an illustration of a perspective view of a radius filler material at an intersection between a placement surface and a mandrel in accordance with an illustrative embodiment.

Turning now to FIG. 5, an illustration of a perspective view of a radius filler material at an intersection between a placement surface and a mandrel is depicted in accordance with an illustrative embodiment. In some illustrative examples, view 500 is a view of radius filler material 502 in manufacturing environment 400 of FIG. 4. As depicted, radius filler material 502 is positioned at intersection 504 of mandrel 506 and placement surface 508.

Radius filler material 502 is physical implementation of radius filler material 118 of FIG. 1. Radius filler material 502 may be referred to as a partially formed or square radius filler material. In some illustrative examples, radius filler 502 may be referred to as an unformed radius filler material. Radius filler 502 does not have a desired shape.

As depicted, radius filler material 502 is in contact with composite ply 510. Composite ply 510 is wrapped around mandrel 506. Composite ply 510 may be referred to as an "inner ply." Composite ply 510 forms an inner surface of a composite stringer formed using composite ply 510 and radius filler material 502. Composite ply 510 and radius filler material 502 may be used to form composite stringer 200 of FIG. 2.

Other films may be present on mandrel 506 or placement surface 508 that are not visible in FIG. 5. For example, at least one of a breather layer, a barrier film layer, or a release film may be associated with at least one of mandrel 506 or placement surface 508. In other non-depicted illustrative examples, composite ply 510 is not present.

As depicted, cap-forming portion 512 of mechanical shaping tool 514 is in contact with composite ply 510. Mechanical shaping tool 514 is a physical implementation of mechanical shaping tool 116 of FIG. 1. Plurality of mechanical fingers 516 applies mechanical pressure to radius filler material 502 to shape radius filler material 502 to a shaped radius filler, such as shaped radius filler 102 of FIG. 1. In some illustrative examples, application of mechanical pressure to radius filler material 502 forms shaped radius filler 204 of FIG. 2.

In some illustrative examples, a set of flexible forming sheets is placed over radius filler material 502 prior to application of mechanical pressure by plurality of mechanical fingers 516. In some illustrative examples, at least one of a slip sheet or a vacuum bagging material is placed over radius filler material 502 prior to application of mechanical pressure by plurality of mechanical fingers 516.

In some illustrative examples, after application of mechanical pressure to radius filler material 502 to form a shaped radius filler, plurality of mechanical fingers 516 are used to apply a composite ply over the shaped radius filler. In these illustrative examples, plurality of mechanical fingers 516 sweep over the composite ply to apply the composite ply over composite ply 510 and the shaped radius filler.

Although composite ply 510 is depicted in FIG. 5, in some non-depicted examples, composite ply 510 is optional. In some non-depicted examples, radius filler material 502 is in direct contact with mandrel 506 or with a film present on mandrel 506, such as a release layer, a breather material, or other desirable film.

Figure 6:
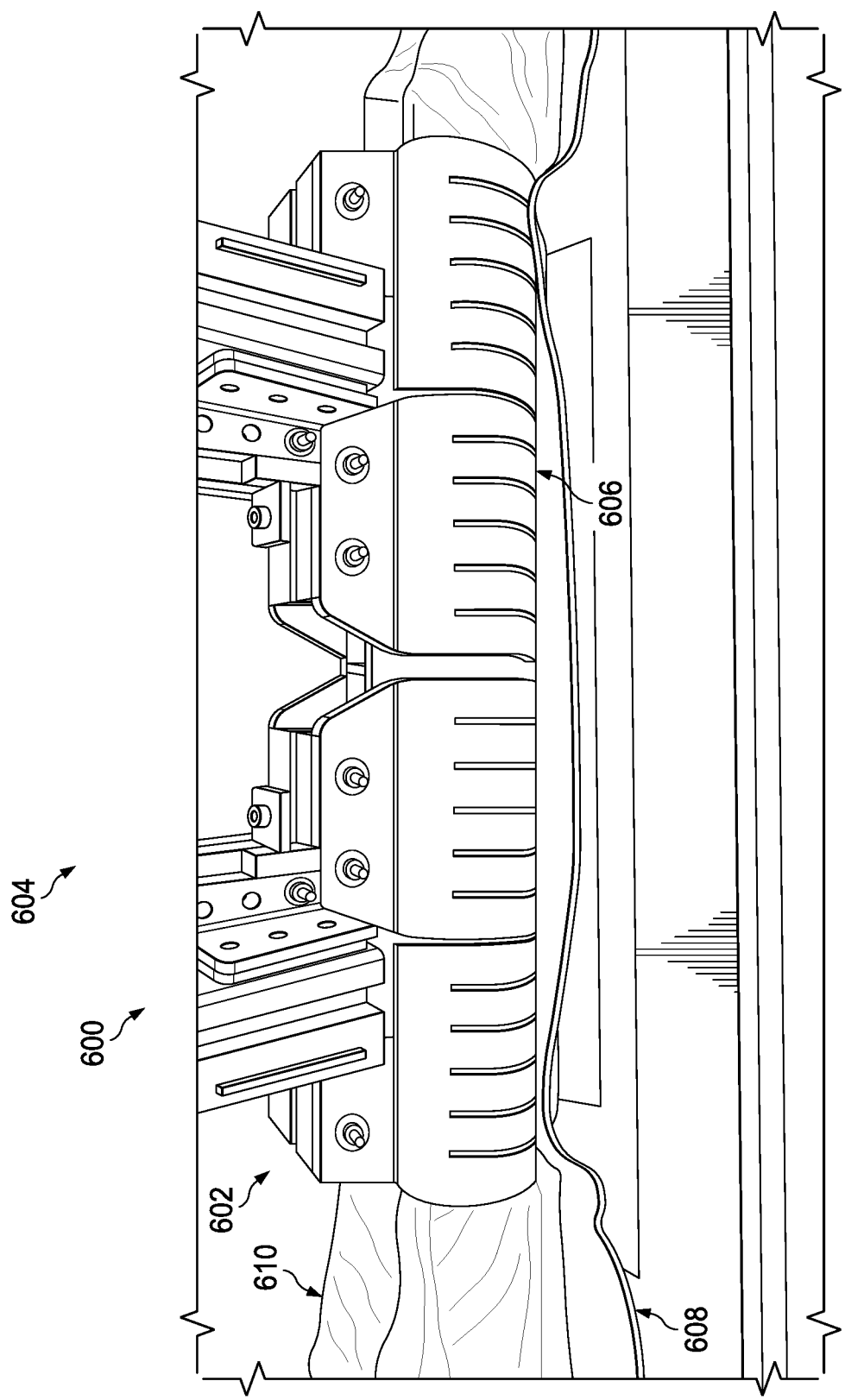
FIG. 6 is an illustration of a view of a mechanical shaping tool during forming of a radius filler material in accordance with an illustrative embodiment.

Turning now to FIG. 6, an illustration of a view of a mechanical shaping tool during forming of a radius filler material is depicted in accordance with an illustrative embodiment. Manufacturing environment 600 of FIG. 6 is a physical implementation of manufacturing environment 100 of FIG. 1. Mechanical shaping tool 602 may be the same as mechanical shaping tool 402 of FIG. 4. View 604 may be a view of mechanical shaping tool 514 of FIG. 5.

In view 604, plurality of mechanical fingers 606 of mechanical shaping tool 602 are engaged in applying mechanical pressure to a radius filler material (not depicted). In view 604, set of flexible forming sheets 608 are positioned over the mandrel (not depicted) and radius filler material (not depicted). As depicted, slip sheet 610 is an outer sheet of set of flexible forming sheets 608. Slip sheet 610 allows plurality of mechanical fingers 606 to slide down to a desired location to apply pressure to the radius filler material.

Figure 7:
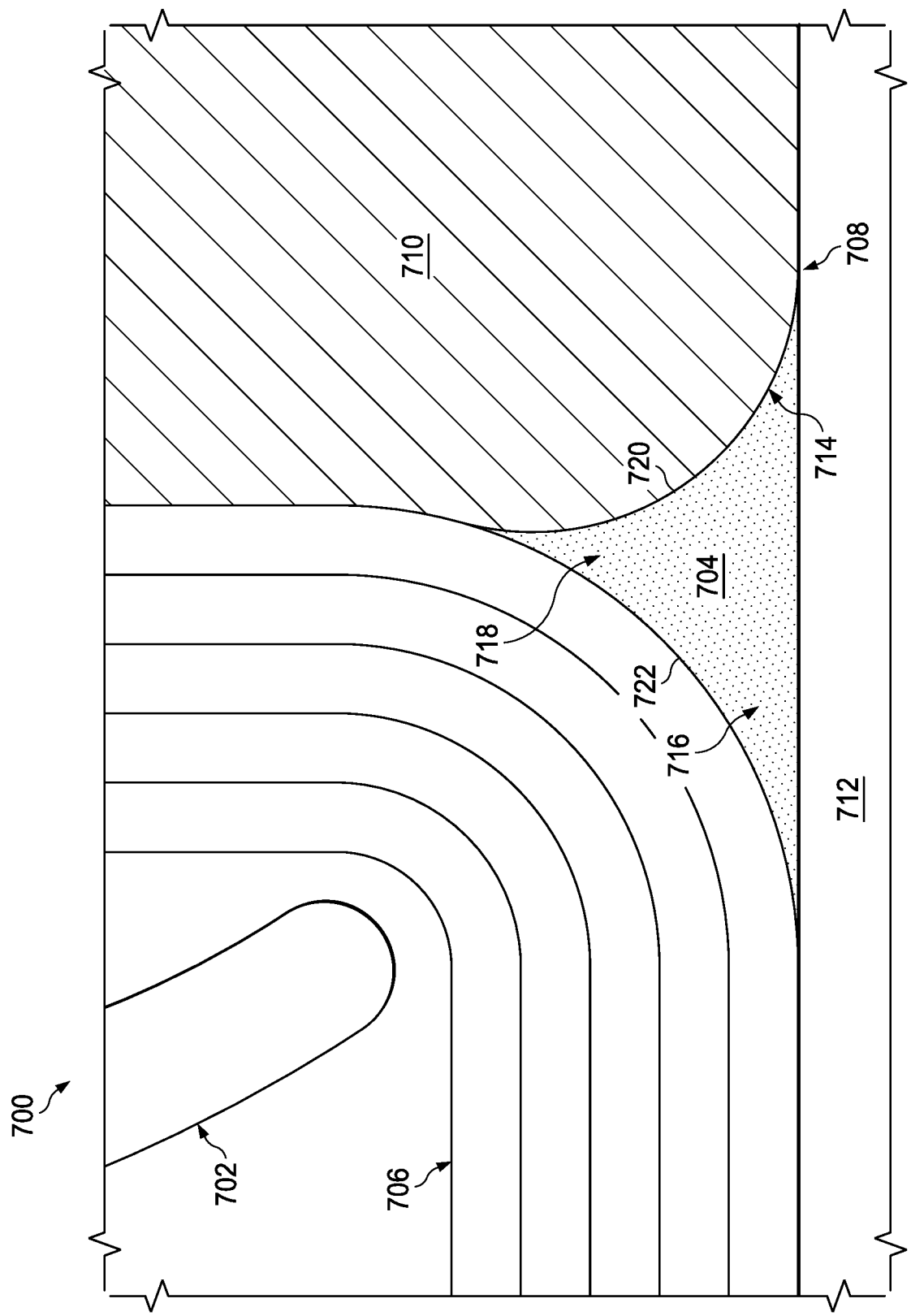
FIG. 7 is an illustration of a cross-sectional view of a mechanical shaping tool during forming of a radius filler material in accordance with an illustrative embodiment.

Turning now to FIG. 7, an illustration of a cross-sectional view of a mechanical shaping tool during forming of a radius filler material is depicted in accordance with an illustrative embodiment. View 700 may be a cross-sectional view of manufacturing environment 600 of FIG. 6. In view 700, plurality of mechanical fingers 702 apply mechanical pressure to radius filler material 704. Radius filler material 704 is a physical implementation of radius filler material 118 of FIG. 1.

In view 700, plurality of mechanical fingers 702 press against set of flexible forming sheets 706. Radius filler material 704 is positioned at intersection 708 of mandrel 710 and placement surface 712. Mandrel 710 has radius 714.

Radius filler material 704 has been shaped to form shaped radius filler 716. Shaped radius filler 716 is a physical implementation of shaped radius filler 102. In some illustrative examples, shaped radius filler 716 is the same as shaped radius filler 202 or shaped radius filler 204. In some illustrative examples, shaped radius filler 716 is the same as shaped radius filler 300.

Shaped radius filler 716 has desired shape 718 including inner radius 720 and outer radius 722. Inner radius 720 is formed by radius 714 of mandrel 710. Outer radius 722 is formed by application of mechanical force by plurality of mechanical fingers 702 and is created by an angle of the application of mechanical force and set of flexible forming sheets 706. Changing a quantity, thickness, or material of set of flexible of forming sheets 706 modifies outer radius 722.

The illustration of radius filler material 704 in FIG. 7 is not meant to imply physical or architectural limitations to the manner in which an illustrative embodiment may be implemented. Other components in addition to or in place of the ones illustrated may be used. Some components may be unnecessary.

For example, in FIG. 7, radius filler material 704 contacts mandrel 710 and placement surface 712. In other illustrative examples, at least one of mandrel 710 or placement surface 712 has at least one of a breather layer, a barrier film layer, a release film, or a composite layer.

As another example, desired shape 718 is a non-limiting example of a cross-sectional shape for radius filler material 704. A desired shape has any desirable inner radius, outer radius, height, and base. A cross-sectional shape may be changed by selecting a mandrel with a different radius. A cross-sectional shape may be changed by changing a quantity or type of sheets in set of flexible forming sheets 706.

Figure 8:
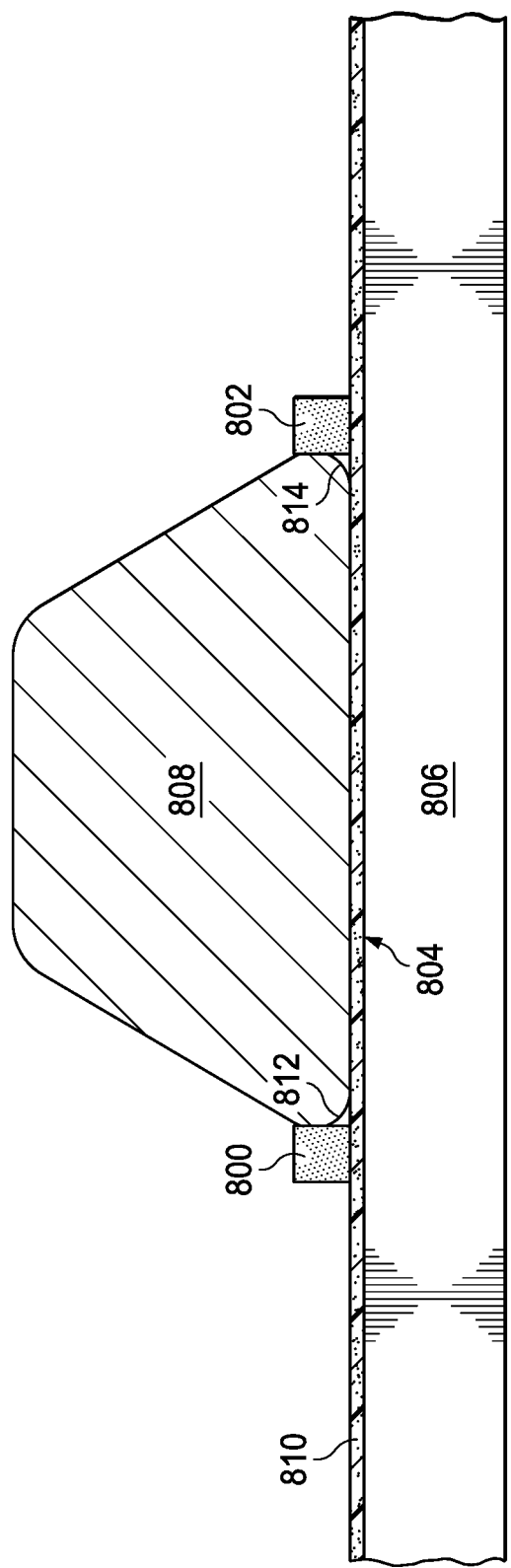
FIG. 8 is an illustration of a cross-sectional view of a partially shaped radius filler material positioned relative to a mandrel in accordance with an illustrative embodiment.

Turning now to FIG. 8, an illustration of a cross-sectional view of partially shaped radius filler material positioned relative to a mandrel is depicted in accordance with an illustrative embodiment. Radius filler material 800 and radius filler material 802 are positioned at intersection 804 of placement surface 806 and mandrel 808. As depicted, radius filler material 800 and radius filler material 802 are partially shaped. Radius filler material 800 and radius filler material 802 have approximately square cross-sectional shapes.

As depicted, composite ply 810 is positioned on placement surface 806. Composite ply 810 may be referred to as a "base ply." In some illustrative examples, placement surface 806 comprises a heater base plate. Other films or layers (not depicted), such as at least one of a breather layer, a barrier film layer, or a release film may be associated with placement surface 806. Other films or layers (not depicted), such as at least one of a breather layer, a barrier film layer, or a release film may be associated with mandrel 808.

Radius filler material 800 is associated with radius 812 of mandrel 808. Radius filler material 802 is associated with radius 814 of mandrel 808.

Figure 9:
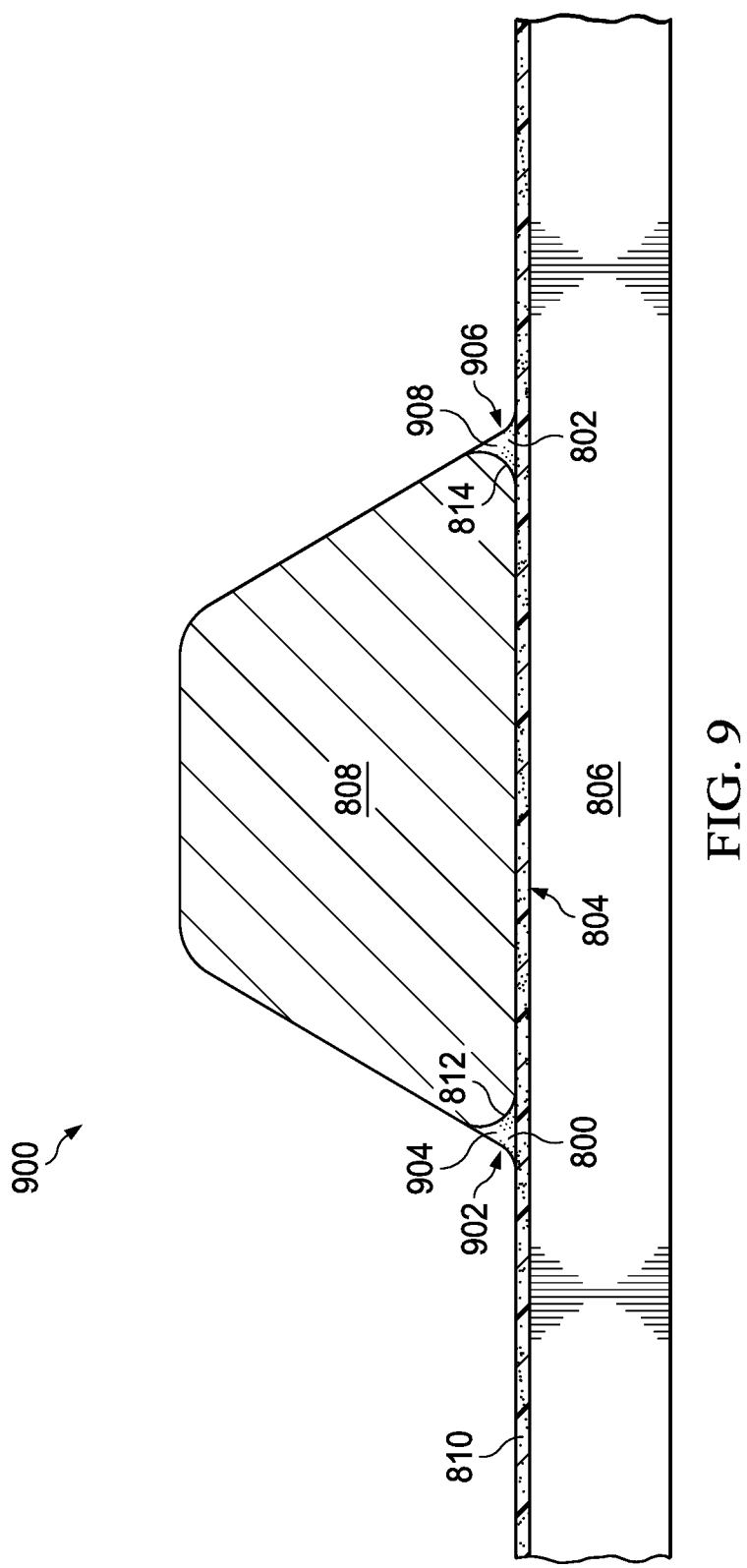
FIG. 9 is an illustration of a cross-sectional view of two shaped radius fillers in a radii of a mandrel in accordance with an illustrative embodiment.

Turning now to FIG. 9, an illustration of a cross-sectional view of two shaped radius fillers in a radii of a mandrel is depicted in accordance with an illustrative embodiment. In view 900, radius filler material 800 has been shaped to form shaped radius filler 902 having desired shape 904. Radius filler material 800 has been shaped against radius 812 of mandrel 808.

Radius filler material 802 has been shaped to form shaped radius filler 906 having desired shape 908. Radius filler material 802 has been shaped against radius 814 of mandrel 808.

Between FIG. 8 and FIG. 9, heat, mechanical pressure, and vacuum are applied to radius filler material 800 and radius filler material 802. In view 900, a mechanical shaping tool and vacuum equipment, such as a vacuum source vacuum bags, for applying mechanical pressure and applying vacuum are not depicted.

Figure 10:
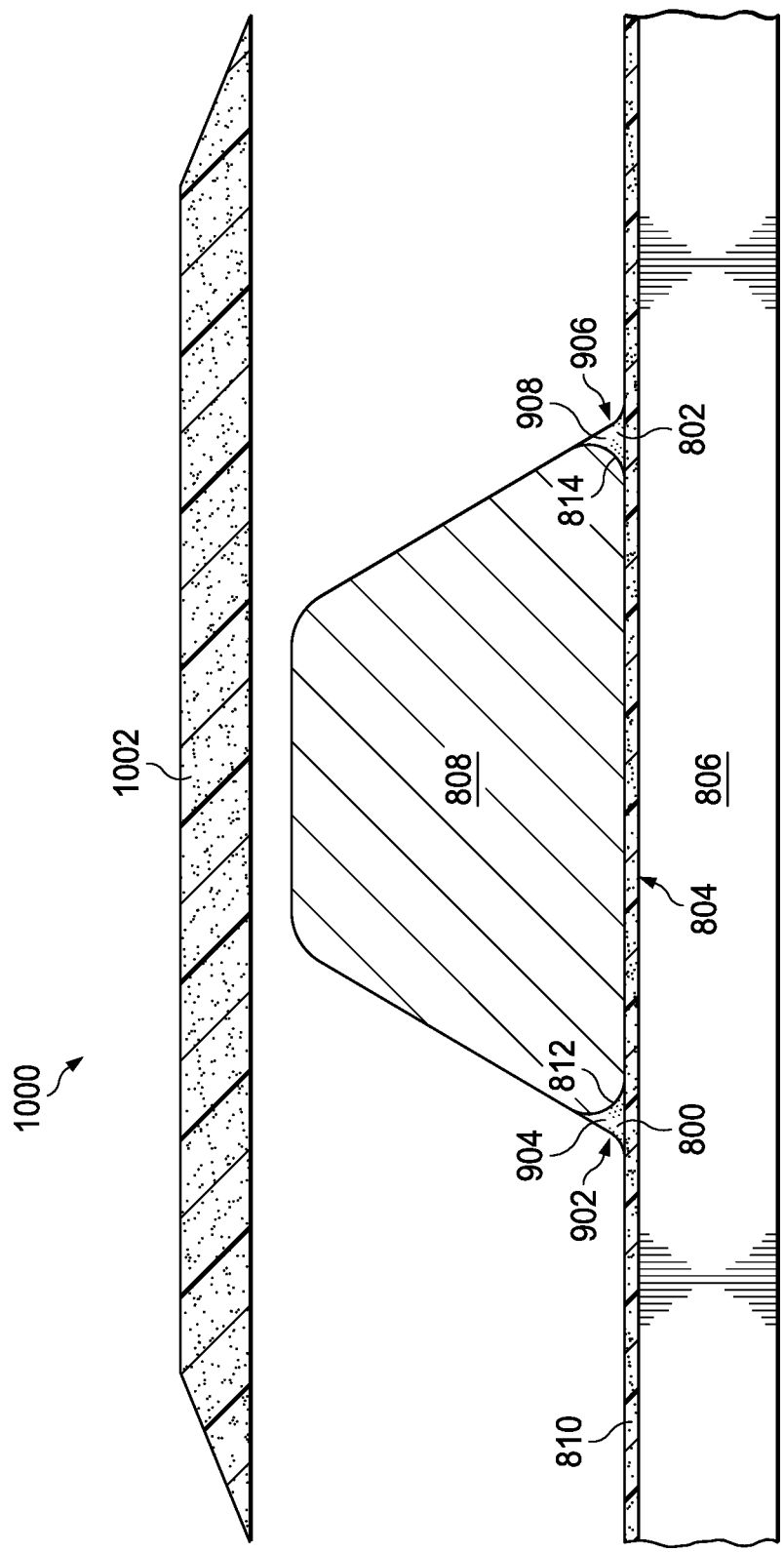
FIG. 10 is an illustration of a cross-sectional view of a composite ply prior to being shaped over shaped radius fillers and a mandrel in accordance with an illustrative embodiment.

Turning now to FIG. 10, an illustration of a cross-sectional view of a composite ply prior to being shaped over shaped radius fillers and a mandrel is depicted in accordance with an illustrative embodiment. In view 1000 composite ply 1002 is positioned to be placed over shaped radius filler 902 and shaped radius filler 906. Composite ply 1002 is a physical implementation of composite ply 136 of FIG. 1. In some illustrative examples, composite ply 1002 will be applied over shaped radius filler 902, mandrel 808, and shaped radius filler 906 using the same mechanical shaping tool used to shape radius filler material 800 and radius filler material 802.

Figure 11:
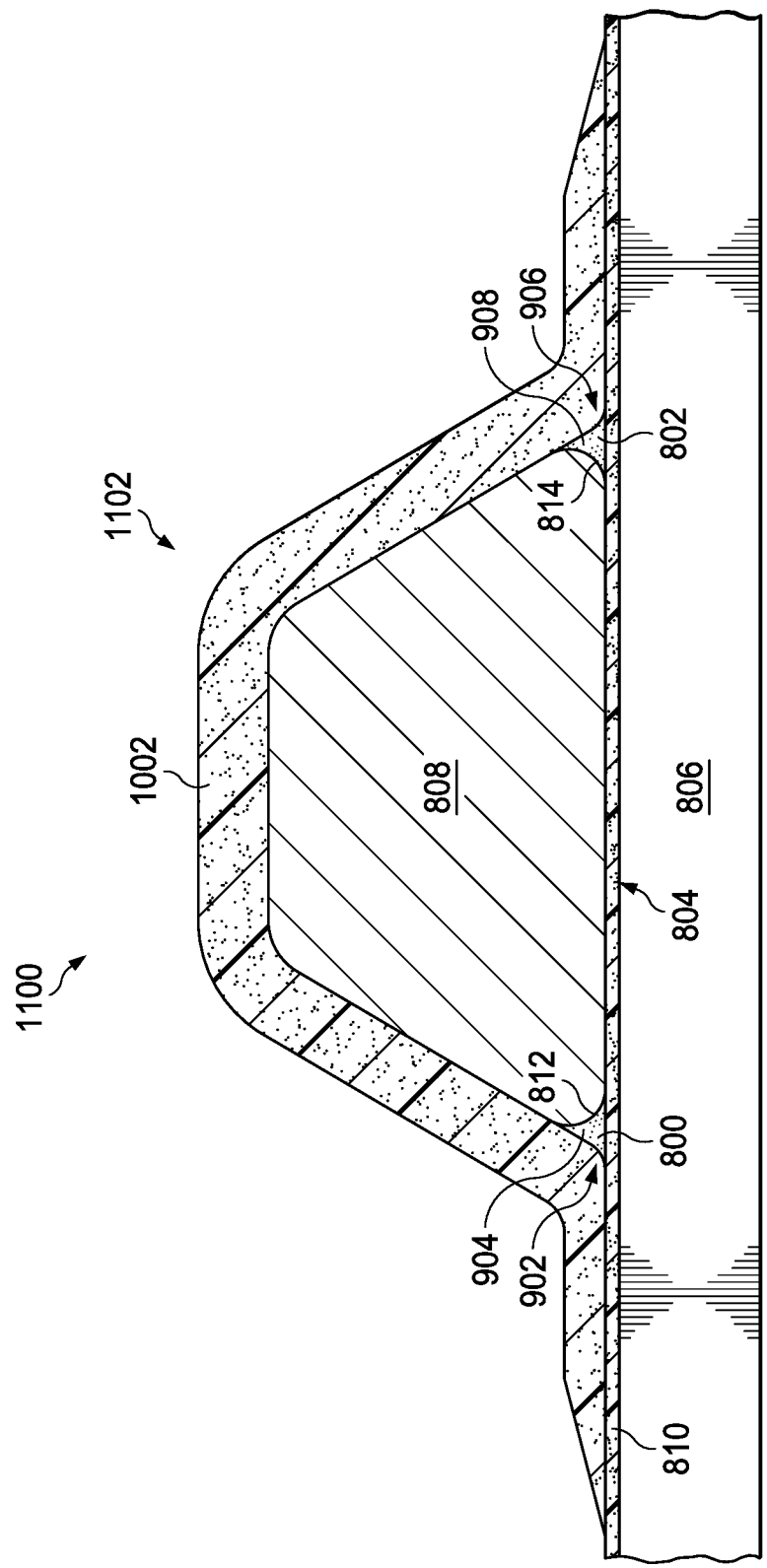
FIG. 11 is an illustration of a cross-sectional view of a composite stringer with shaped radius fillers in accordance with an illustrative embodiment.

Turning now to FIG. 11, an illustration of a cross-sectional view of a composite stringer with shaped radius fillers is depicted in accordance with an illustrative embodiment. In view 1100, composite ply 1002 has been placed over shaped radius filler 902, mandrel 808, and shaped radius filler 906 to form composite stringer 1102. Composite stringer 1102 includes composite ply 810, shaped radius filler 902, shaped radius filler 906, and composite ply 1002.

By shaping radius filler material 800 and radius filler material 802 against the same mandrel as shaping composite ply 1002, mandrel 808, at least one of manufacturing time or manufacturing cost may be reduced. By forming radius filler material 800 and radius filler material 802 against mandrel 808, transporting steps are reduced.

In some illustrative examples, composite stringer 1102 is transported and placed against a composite skin (not depicted) using mandrel 808. In some illustrative examples, composite stringer 1102 is transported and placed into a cavity of a cure tool, such as cure tool 146 of FIG. 1. In some illustrative examples, composite stringer 1102 is cured with mandrel 808 in contact with composite ply 1002.

FIGS. 8-11 depict a non-limited example of the formation of a composite stringer, composite stringer 1102. In some illustrative examples, composite ply 810 and composite ply 1002 may not be present. In some illustrative examples, radius filler material may be shaped using a mandrel. After shaping the radius filler material, the shaped radius filler and mandrel may be transported and placed in contact with a composite skin, a composite ply, or a tool.

The different components shown in FIGS. 2-11 may be combined with components in FIG. 1, used with components in FIG. 1, or a combination of the two. Additionally, some of the components in FIGS. 2-11 may be illustrative examples of how components shown in block form in FIG. 1 can be implemented as physical structures.

Figure 12:
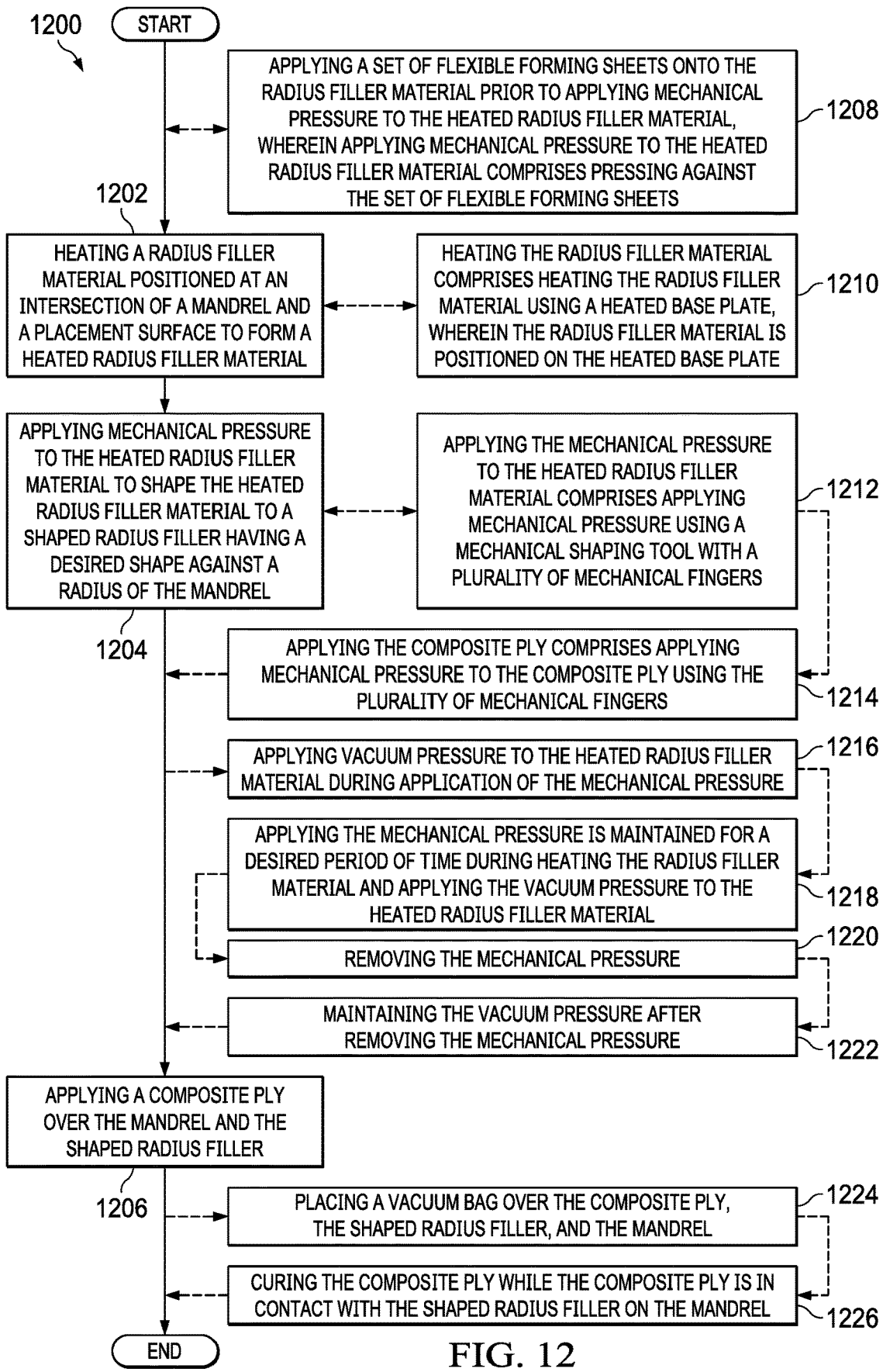
FIG. 12 is an illustration of a flowchart of a method for forming a composite stringer with a shaped radius filler in accordance with an illustrative embodiment.

Turning now to FIG. 12, an illustration of a flowchart of a method for forming a composite stringer with a shaped radius filler is depicted in accordance with an illustrative embodiment. Method 1200 may be implemented in manufacturing environment 100 of FIG. 1. Method 1200 may be used to form shaped radius filler 202 or shaped radius filler 204 of FIG. 2. Method 1200 may be used to form shaped radius filler 300 of FIG. 3. Method 1200 may be implemented using equipment depicted in manufacturing environment 400 of FIGS. 4 and 5, such as mechanical shaping tool 402. Method 1200 may be performed using mechanical shaping tool 602 of FIG. 6. View 700 may be a view of forming the radius filler material as in method 1200. Views 800-1100 of FIGS. 8-11 may be components of a composite stringer before, during, or after operations of method 1200.

Method 1200 heats a radius filler material positioned at an intersection of a mandrel and a placement surface to form a heated radius filler material (operation 1202). When the radius filler material is positioned at an intersection of the mandrel and the placement surface, the radius filler material is in contact with at least one of the mandrel, a film on the mandrel, or a composite ply on the mandrel. In some illustrative examples, the composite stringer to be formed has an inner ply. In these illustrative examples, the radius filler material positioned at the intersection is in direct contact with the inner ply on the mandrel. In some illustrative examples, an inner ply is not present in the composite stringer. In these illustrative examples, the radius filler material is in contact with the mandrel or with a film, such as a breather film, release film, or other desirable film, on the mandrel.

When the radius filler material is positioned at an intersection of the mandrel and the placement surface, the radius filler material is in contact with at least one of the placement surface, a film on the placement surface, or a composite ply on the placement surface. In some illustrative examples, the composite stringer to be formed has a base ply. In these illustrative examples, the radius filler material positioned at the intersection is in direct contact with the base ply on the placement surface. In some illustrative examples, a base ply is not present in the composite stringer. In these illustrative examples, the radius filler material is in contact with the placement surface or with a film, such as a breather film, release film, or other desirable film, on the placement surface.

Method 1200 applies mechanical pressure to the heated radius filler material to shape the heated radius filler material to a shaped radius filler having a desired shape against a radius of the mandrel (operation 1204). Method 1200 applies a composite ply over the mandrel and the shaped radius filler (operation 1206). In some illustrative examples, method 1200 terminates afterwards.

In other illustrative examples, other operations may be performed in addition to operations 1202-1206. In some illustrative examples, method 1200 applies a set of flexible forming sheets onto the radius filler material prior to applying mechanical pressure to the heated radius filler material, wherein applying mechanical pressure to the heated radius filler material comprises pressing against the set of flexible forming sheets (operation 1208).

In some illustrative examples, the placement surface is a heated base plate. In some of these illustrative examples, heating the radius filler material comprises heating the radius filler material using the heated base plate, wherein the radius filler material is positioned on the heated base plate (operation 1210).

In some illustrative examples, applying the mechanical pressure to the heated radius filler material comprises applying mechanical pressure using a mechanical shaping tool with a plurality of mechanical fingers (operation 1212). In some illustrative examples, applying the composite ply comprises applying mechanical pressure to the composite ply using the plurality of mechanical fingers (operation 1214).

In some illustrative examples, method 1200 applies vacuum pressure to the heated radius filler material during application of the mechanical pressure (operation 1216). In some illustrative examples, applying the mechanical pressure is maintained for a desired period of time during heating the radius filler material and applying the vacuum pressure to the heated radius filler material (operation 1218).

In some illustrative examples, method 1200 removes the mechanical pressure (operation 1220) and maintains the vacuum pressure after removing the mechanical pressure (operation 1222).

In some illustrative examples, method 1200 places a vacuum bag over the composite ply, the shaped radius filler, and the mandrel (operation 1224). In some illustrative examples, method 1200 cures the composite ply while the composite ply is in contact with the shaped radius filler on the mandrel (operation 1226).

Figure 13:
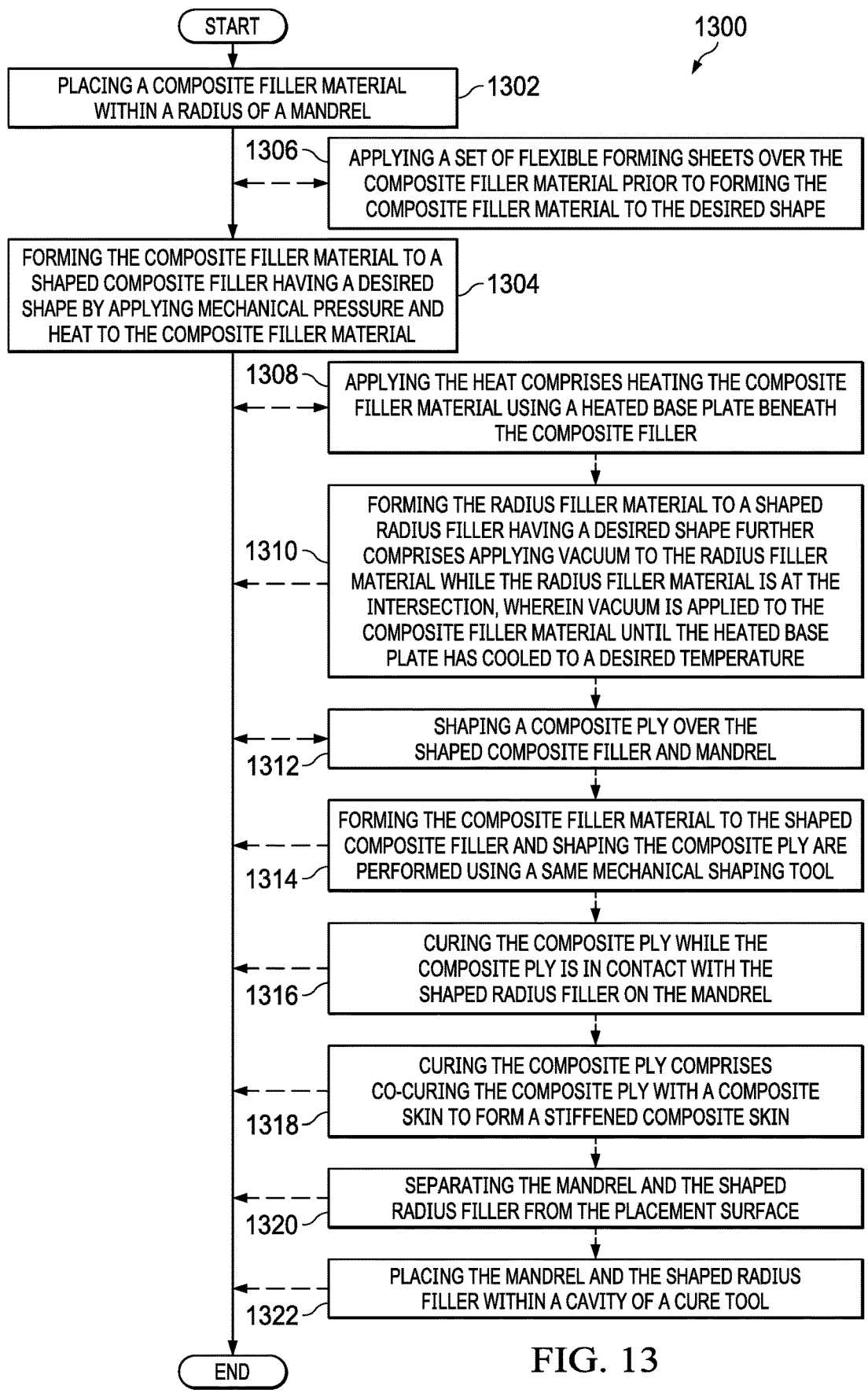
FIG. 13 is an illustration of a flowchart of a method for forming a shaped radius filler in accordance with an illustrative embodiment.

Turning now to FIG. 13, an illustration of a flowchart of a method for forming a shaped radius filler is depicted in accordance with an illustrative embodiment. Method 1300 may be implemented in manufacturing environment 100 of FIG. 1. Method 1300 may be used to form shaped radius filler 202 or shaped radius filler 204 of FIG. 2. Method 1300 may be used to form shaped radius filler 300 of FIG. 3. Method 1300 may be implemented using equipment depicted in manufacturing environment 400 of FIGS. 4 and 5, such as mechanical shaping tool 402. Method 1300 may be performed using mechanical shaping tool 602 of FIG. 6. View 700 may be a view of forming the radius filler material as in method 1300. Views 800-1100 of FIGS. 8-11 may be components of a composite stringer before, during, or after operations of method 1300.

Method 1300 places a radius filler material at an intersection of a mandrel and a placement surface (operation 1302). The radius filler material has any desirable composition. In some illustrative examples, radius filler material is formed of layers of adhesive material. In some illustrative examples, radius filler material is a partially formed radius filler. In some illustrative examples, radius filler material is a square adhesive noodle.

Method 1300 forms the radius filler material to a shaped radius filler having a desired shape by applying mechanical pressure and heat to the radius filler material while the radius filler material is at the intersection (operation 1304). In some illustrative examples, method 1300 terminates afterwards.

In other illustrative examples, other operations may be performed in addition to operations 1302-1304. In some illustrative examples, method 1300 applies a set of flexible forming sheets over the radius filler material prior to forming the radius filler material to the desired shape (operation 1306). The set of flexible forming sheets comprises any desirable quantity of flexible forming sheets. The set of flexible forming sheets has any desirable material characteristics. The set of flexible forming sheets modify an outer radius of the desired shape of the shaped radius filler.

In some illustrative examples, applying the heat comprises heating the radius filler material using a heated base plate beneath the radius filler (operation 1308). In some illustrative examples, forming the radius filler material to a shaped radius filler having a desired shape further comprises applying vacuum to the radius filler material while the radius filler material is at the intersection, wherein vacuum is applied to the radius filler material until the heated base plate has cooled to a desired temperature (operation 1310).

In some illustrative examples, method 1300 shapes a composite ply over the shaped radius filler and mandrel (operation 1312). In some illustrative examples, forming the radius filler material to the shaped radius filler and shaping the composite ply are performed using a same mechanical shaping tool (operation 1314). In some illustrative examples, method 1300 cures the composite ply while the composite ply is in contact with the shaped radius filler on the mandrel (operation 1316). In some illustrative examples, curing the composite ply comprises co-curing the composite ply with a composite skin to form a stiffened composite skin (operation 1318).

In some illustrative examples, method 1300 separates the mandrel and the shaped radius filler from the placement surface (operation 1320) and places the mandrel and the shaped radius filler within a cavity of cure tool (operation 1322).

Figure 14:
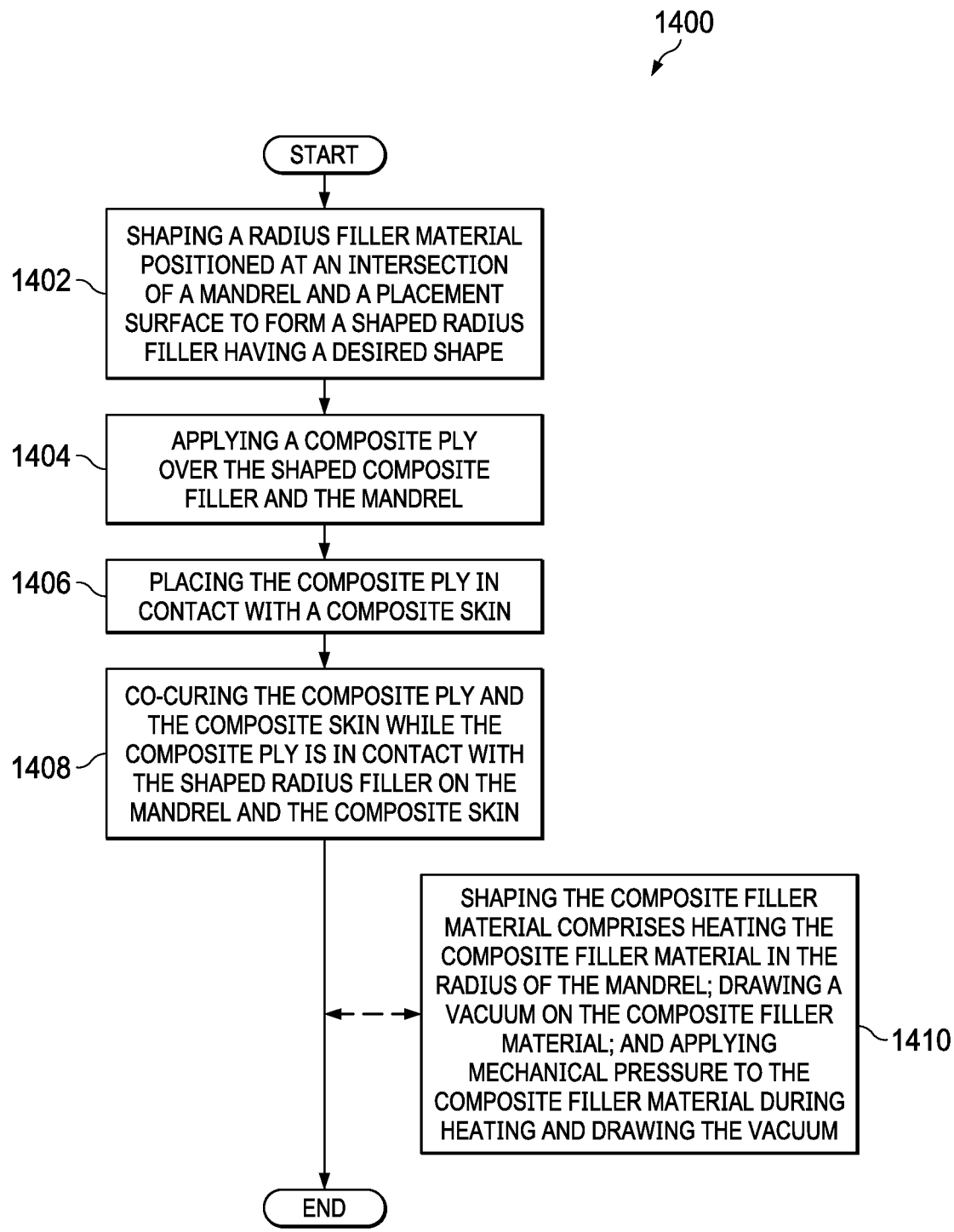
FIG. 14 is an illustration of a flowchart of a method for forming a cured composite stringer in accordance with an illustrative embodiment.

Turning now to FIG. 14, an illustration of a flowchart of a method for forming a cured composite stringer is depicted in accordance with an illustrative embodiment. Method 1400 may be implemented in manufacturing environment 100 of FIG. 1. Method 1400 may be used to form shaped radius filler 202 or shaped radius filler 204 of FIG. 2. Method 1400 may be used to form shaped radius filler 300 of FIG. 3. Method 1400 may be implemented using equipment depicted in manufacturing environment 400 of FIGS. 4 and 5, such as mechanical shaping tool 402. Method 1400 may be performed using mechanical shaping tool 602 of FIG. 6. View 700 may be a view of forming the radius filler material as in method 1400. Views 800-1100 of FIGS. 8-11 may be components of a composite stringer before, during, or after operations of method 1400.

Method 1400 shapes a radius filler material positioned at an intersection of a mandrel and a placement surface to form a shaped radius filler having a desired shape (operation 1402). Method 1400 applies a composite ply over the shaped radius filler and the mandrel (operation 1404). Method 1400 places the composite ply in contact with a composite skin (operation 1406). Method 1400 co-cures the composite ply and composite skin while the composite ply is in contact with the shaped radius filler on the mandrel and the composite skin (operation 1408). In some illustrative examples, method 1400 terminates afterwards.

In other illustrative examples, other operations may be performed in addition to operations 1402-1408. In some illustrative examples, shaping the radius filler material comprises heating the radius filler material positioned at the intersection of the mandrel and the placement surface; drawing a vacuum on the radius filler material; and applying mechanical pressure to the radius filler material during heating and drawing the vacuum (operation 1410).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. In some illustrative examples, not all blocks are performed and some blocks may be optional, in a flowchart or block diagram.

For example, operations 1208-1226 of FIG. 12 may be optional. As another example, operations 1306-1322 of FIG. 13 may be optional. As yet a further example, operations 1410-1414 of FIG. 14 may be optional.

Figure 15:
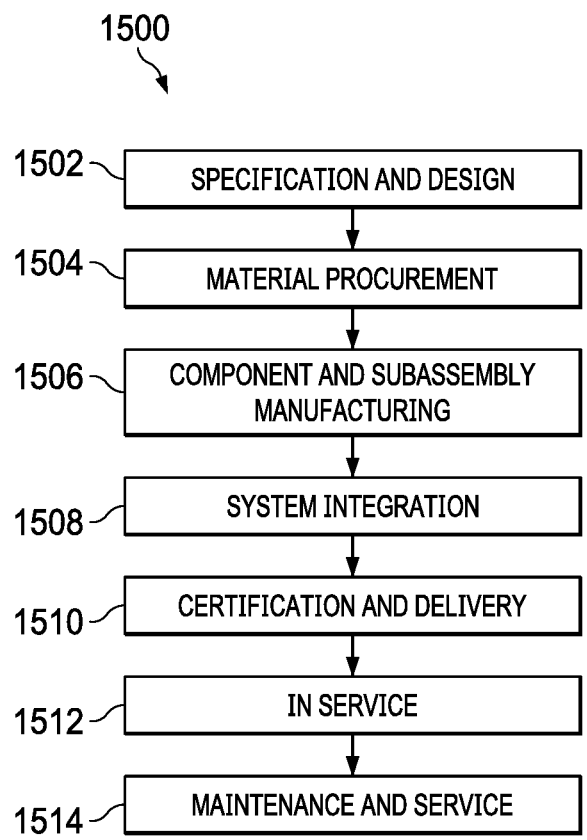
FIG. 15 is an illustration of an aircraft manufacturing and service method in the form of a block diagram in accordance with an illustrative embodiment.
Figure 16:
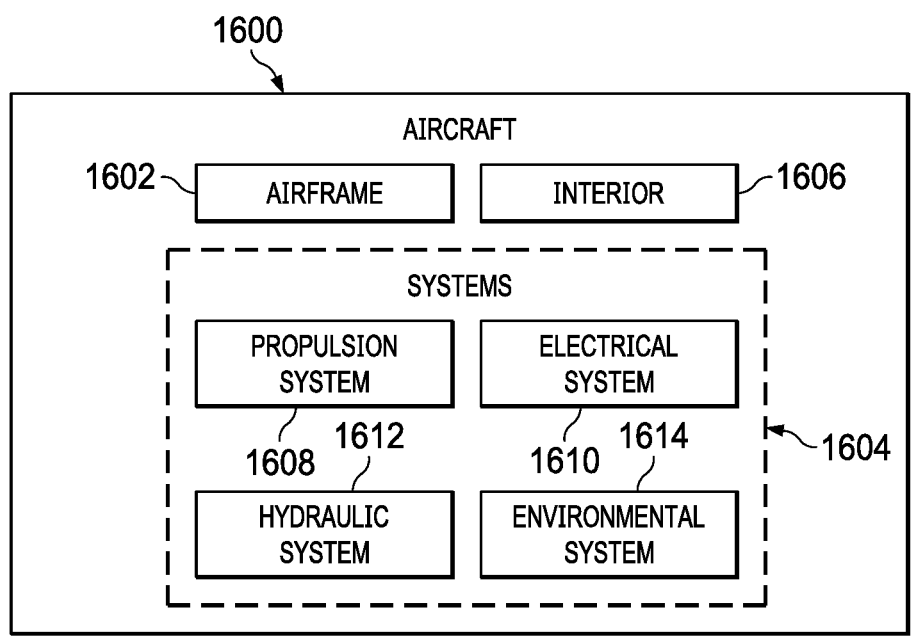
FIG. 16 is an illustration of an aircraft in the form of a block diagram in which an illustrative embodiment may be implemented.

Illustrative embodiments of the present disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During preproduction, aircraft manufacturing and service method 1500 may include specification and design 1502 of aircraft 1600 in FIG. 16 and material procurement 1504.

During production, component and subassembly manufacturing 1506 and system integration 1508 of aircraft 1600 takes place. Thereafter, aircraft 1600 may go through certification and delivery 1510 in order to be placed in service 1512. While in service 1512 by a customer, aircraft 1600 is scheduled for routine maintenance and service 1514, which may include modification, reconfiguration, refurbishment, or other maintenance and service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 of FIG. 15 and may include airframe 1602 with plurality of systems 1604 and interior 1606. Examples of systems 1604 include one or more of propulsion system 1608, electrical system 1610, hydraulic system 1612, and environmental system 1615. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500. One or more illustrative embodiments may be used during at least one of component and subassembly manufacturing 1506, system integration 1508, or maintenance and service 1514 of FIG. 15. For example, a shaped radius filler, such as shaped radius filler 102 of FIG. 1 may be formed during component and subassembly manufacturing 1506. As another example, a stiffener including a shaped radius filler may be a replacement part in maintenance and service 1514.

Apparatuses and methods embodied herein may be employed in aircraft 1600. A shaped radius filler may be present in at least one of airframe 1602 or interior 1606.

The illustrative embodiments provide a method and apparatus for shaping radius fillers against a mandrel. In some illustrative examples, shaping radius fillers against a mandrel reduces the manufacturing time for a composite stringer. In some illustrative examples, shaping radius fillers against a mandrel reduces the transportation steps for radius fillers.

Shaping radius fillers against a mandrel provides a method for shaping the radius fillers and at least one composite ply using the same mechanical shaping tool. Using the same mechanical shaping tool may reduce at least one of the quantity of tooling used for forming composite stringers, transportation time, or a footprint for tooling for forming composite stringers.

In some illustrative examples, the mandrel is used to cure the composite stringer formed on the mandrel. In some illustrative examples, shaping the radius fillers of a composite stringer against a same mandrel used for curing the composite stringer may be referred to as "shaping in place."

The illustrative examples provide methods and apparatuses for shaping radius fillers that are easily adjustable to change a cross-sectional shape of the radius fillers produced. The illustrative examples may have at least one of a lower cost, a lower transportation time, or a greater adjustability than pre-shaping radius fillers on a separate mold or separate hard tooling independent of the mandrel. Manufacturing of different radius shapes in radius fillers can be accomplished by using different mandrels or introducing additional material between the ends of a plurality of mechanical fingers and the radius filler material.

The illustrative examples may provide for increased uses of radius filler material formed of adhesive layers. The illustrative examples may provide for at least one of easier, faster, or higher quality manufacturing of stiffened composite skins having an OML tool.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
    heating a radius filler material positioned at an intersection of a mandrel and a placement surface to form a heated radius filler material, wherein the placement surface is a heated base plate, wherein heating the radius filler material comprises heating the radius filler material using the heated base plate, and wherein the radius filler material is positioned on the heated base plate;
    applying mechanical pressure to the heated radius filler material to shape the heated radius filler material to a shaped radius filler having a desired shape against a radius of the mandrel; and
    applying a composite ply over the mandrel and the shaped radius filler.

2. The method of claim 1, wherein applying the mechanical pressure to the heated radius filler material comprises applying mechanical pressure using a mechanical shaping tool with a plurality of mechanical fingers.

3. The method of claim 2, wherein applying the composite ply comprises applying mechanical pressure to the composite ply using the plurality of mechanical fingers.

4. The method of claim 1 further comprising:
    applying a set of flexible forming sheets onto the radius filler material prior to applying mechanical pressure to the heated radius filler material, wherein applying mechanical pressure to the heated radius filler material comprises pressing against the set of flexible forming sheets.

5. The method of claim 1 further comprising:
    applying vacuum pressure to the heated radius filler material during application of the mechanical pressure.

6. The method of claim 5, wherein applying the mechanical pressure is maintained for a desired period of time during heating the radius filler material and applying the vacuum pressure to the heated radius filler material.

7. The method of claim 6 further comprising:
    removing the mechanical pressure; and
    maintaining the vacuum pressure after removing the mechanical pressure.

8. The method of claim 1 further comprising:
    placing a vacuum bag over the composite ply, the shaped radius filler, and the mandrel; and
    curing the composite ply while the composite ply is in contact with the shaped radius filler on the mandrel.

9. The method of claim 1, wherein at least one of a breather layer, a barrier film layer, or a release film is positioned over at least one of the mandrel or the placement surface.

10. A method comprising:
placing a radius filler material at an intersection of a mandrel and a placement surface, wherein the placement surface comprises a heated base plate, and wherein applying the heat comprises heating the radius filler material using the heated base plate beneath the radius filler material; and
forming the radius filler material to a shaped radius filler having a desired shape by applying mechanical pressure and heat to the radius filler material while the radius filler material is at the intersection.

11. The method of claim 10 further comprising:
applying a set of flexible forming sheets over the radius filler material prior to forming the radius filler material to the desired shape.

12. The method of claim 10 further comprising:
shaping a composite ply over the shaped radius filler and mandrel.

13. The method of claim 12, wherein forming the radius filler material to the shaped radius filler and shaping the composite ply are performed using a same mechanical shaping tool.

14. The method of claim 13 further comprising:
curing the composite ply while the composite ply is in contact with the shaped radius filler on the mandrel.

15. The method of claim 14, wherein curing the composite ply comprises co-curing the composite ply with a composite skin to form a stiffened composite skin.

16. The method of claim 10, wherein forming the radius filler material to a shaped radius filler having a desired shape further comprises applying vacuum to the radius filler material while the radius filler material is at the intersection, wherein vacuum is applied to the radius filler material until the heated base plate has cooled to a desired temperature.

17. The method of claim 10 further comprising:
separating the mandrel and the shaped radius filler from the placement surface; and
placing the mandrel and the shaped radius filler within a cavity of cure tool.

18. A method comprising:
shaping a radius filler material positioned at an intersection of a mandrel and a placement surface to form a shaped radius filler having a desired shape, wherein the placement surface is a heated base plate, and wherein the radius filler material is positioned on the heated base plate;
heating the radius filler material positioned at the intersection of the mandrel and the placement surface, wherein heating the radius filler material comprises heating the radius filler material using the heated base plate;
applying a composite ply over the shaped radius filler and the mandrel;
placing the composite ply in contact with a composite skin; and
co-curing the composite ply and composite skin while the composite ply is in contact with the shaped radius filler on the mandrel and the composite skin.

19. The method of claim 18, wherein shaping the radius filler material comprises:
drawing a vacuum on the radius filler material; and
applying mechanical pressure to the radius filler material during heating of the radius filler and drawing the vacuum.

20. The method of claim 10, wherein at least one of a breather layer, a barrier film layer, or a release film is positioned over at least one of the mandrel or the placement surface.

* * * * *